Oct. 14, 1952     T. G. LLEWHELLIN     2,613,974
TOGGLE FASTENER
Filed June 1, 1949     2 SHEETS—SHEET 1
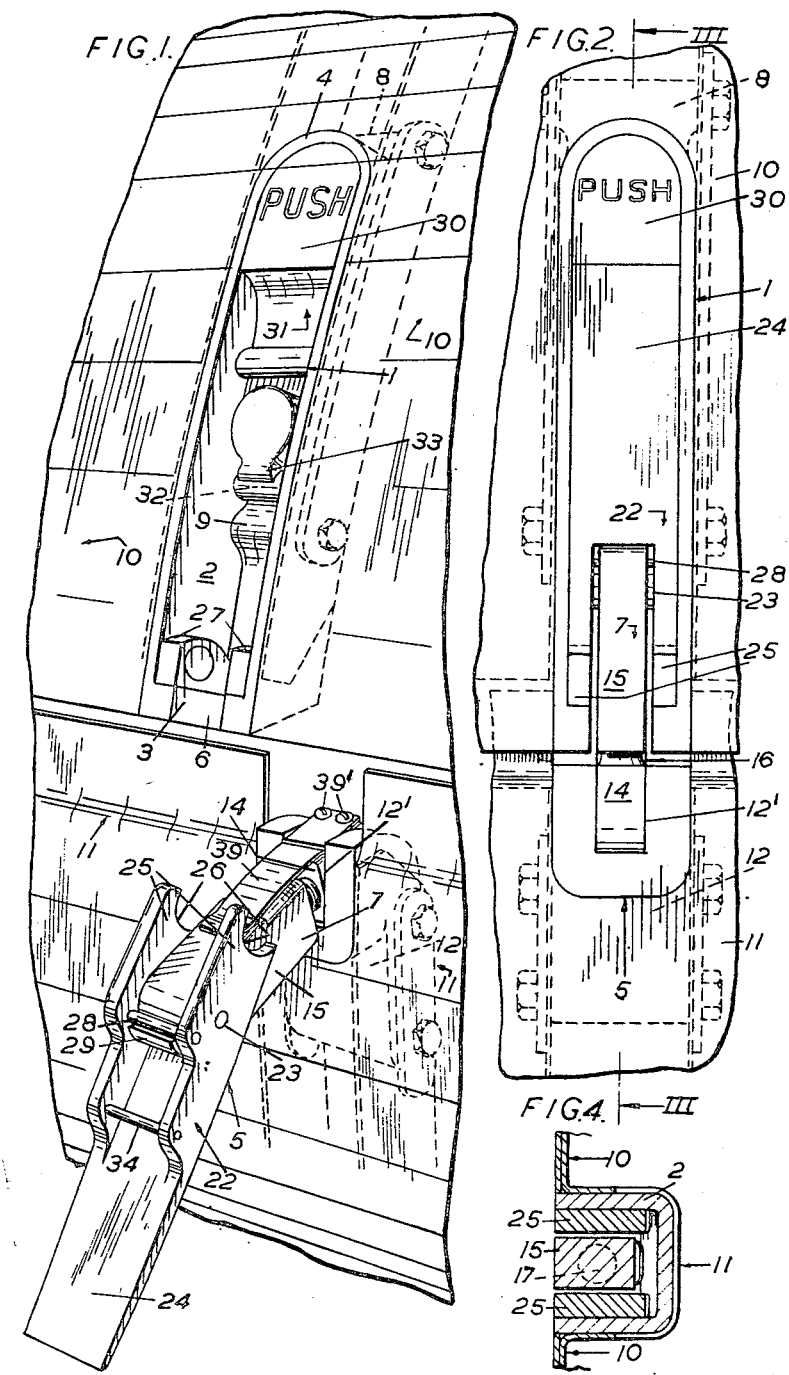
Inventor
Thomas Gerald Llewhellin
Attorney

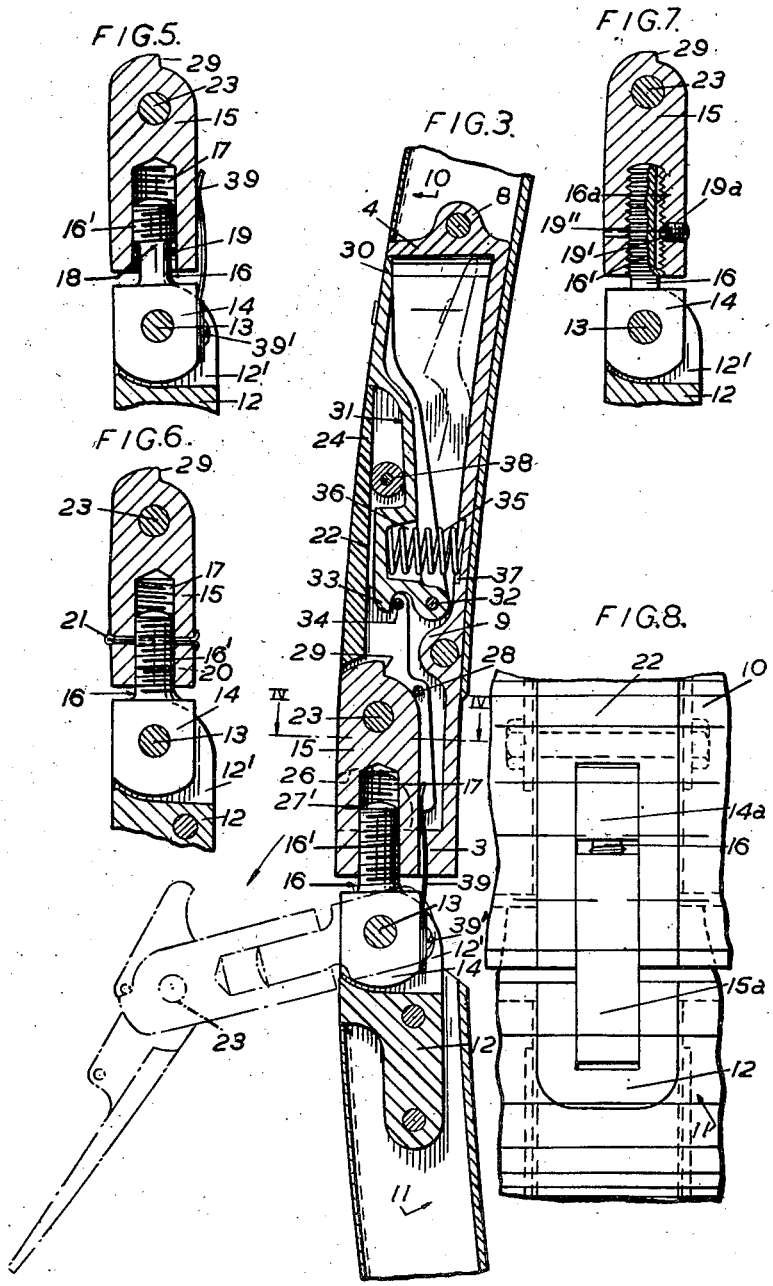

Patented Oct. 14, 1952

2,613,974

UNITED STATES PATENT OFFICE 2,613,974

TOGGLE FASTENER

Thomas G. Llewhellin, Hillington, Glasgow, Scotland, assignor to K. A. C. Limited, Glasgow, Scotland, a British company Application June 1, 1949, Serial No. 96,512
In Great Britain October 8, 1948

10 Claims. (Cl. 292—256)

This invention concerns improvements in or relating to toggle fasteners for releasably securing together a pair of members which are, when released, relatively displaceable. Thus the invention is applicable to the releasable securing of cowling panels, inspection panels, compartment panels, panels generally, covers and the like for aircraft, for use in or on automobiles and railway rolling stock, and for similar purposes. The fastener may also be used for securing the hinged lids of boxes, cases and the like, and for many other similar purposes.

The invention relates particularly to toggle fasteners of the kind used for coupling together a pair of complementary members, and comprising a link pivoted at one end to one of said members, and pivoted at the other end to a locking lever provided with means for engaging a fixed abutment or the like on the other of said members, so that the members are held together securely when the locking lever and link are rotated together to the closed position and are released when the locking lever and link are reversely rotated to the open position.

One object of the invention is to provide a toggle fastener of the kind specified which in the locked position will be a flush fit with the outer surfaces of the two members.

Another object is to provide a toggle fastener having auxiliary locking means for positively retaining the fastener in the locked position.

A further object is to provide a toggle fastener having means for preventing the accidental unlocking of the fastener, for example, by the catching of a garment or the like therein.

In order that this invention may be thoroughly understood and readily carried into practice one embodiment of the same will now be described by way of example with reference to the accompanying drawings, in which:

Figure 1 is a perspective view of a toggle fastener according to the invention, shown in an open or unfastened position, and illustrated, by way of example, as applied to a pair of members capable of being moved away from one another, the upper member being shown moved somewhat away from the lower member;

Figure 2 is a front elevation of a toggle fastener applied as above and shown in the closed or fastened position;

Figure 3 is a sectional view taken on line III—III, Figure 2;

Figure 4 is a sectional view taken on line IV—IV, Figure 3;

Figure 5 is a fragmentary vertical sectional view and illustrates the link portion of the fastener;

Figure 6 is a similar view to Figure 5, and illustrates a modification of the link portion there shown;

Figure 7 is a similar view to Figure 5, and illustrates a modification of the link portion there shown, and, Figure 8 is a similar view to Figure 2, and illustrates the fastener modified to increase its resistance to shear loads.

Referring to the drawings it will be seen that in the particular embodiment shown therein, the secondary part of the fastener (generally indicated by the reference numeral 1) comprises a long hollow or recessed housing 2 of channel shape in cross-section, closed at each end by transverse walls 3 and 4 respectively, the wall 3 at the end of the housing 2 adapted to face the aligned primary part of the fastener (generally indicated by the reference numeral 5) being provided with a slot 6 to receive the toggle link (subsequently described) of the primary part 5 of the fastener.

The secondary part 1 of the fastener is also conveniently provided with lugs 8 and 9 to enable it to be secured to one of the members (indicated generally in the drawings by the reference numeral 10) to be locked to the other of the members (indicated generally in the drawings by the reference numeral 11). The lugs 8 and 9 provided on the housing 2 of the secondary part 1 of the fastener may be secured to flanged portions of the member 10 by nut and bolt connection, as shown, or in any other suitable manner, for example, by riveting thereto.

The primary part 5 of the fastener comprises in part a bracket 12 for securement to flanged portions of the member 11 by nut and bolt connection therewith, as shown, or in any other suitable manner, for example, by riveting thereto, the bracket 12 being longitudinally bifurcated at 12' at the end thereof facing the secondary part 1 of the fastener.

Both the primary part 5 and the secondary part 1 of the fastener are so attached to the members 11 and 10 respectively that the outer surfaces of the said fastener parts lie flush with the surface of the members 11 and 10.

In the bifurcated end 12' of the bracket 12 there is located one end of a link (generally indicated by the reference numeral 7) which is pivoted to this part of the fastener by means of a fixed pivot pin 13 at right angles to the axis length of the link 7 which is adapted to swing about the pivot pin 13 and to enter the slot 6 in the end 3 of the housing 2.

The link 7 is formed in two parts respectively marked 14 and 15, the two parts being screwed together. Thus conveniently the part 14 of the link 7 is pivoted to the bracket 12 and has a shank 16 having a screw-threaded portion 16' which screws into an internal axial screw-threaded bore 17 of the part 15 of the link so that the parts 14 and 15 may be rotated relatively to one another to vary the longitudinal overall length of the link.

Preferably the screw-threaded portion 16' of the shank 16, see Figure 5, is of larger diameter than the non-screw-threaded portion thereof so as to provide an annular shoulder 18 for engagement with a retaining pin 19 inserted into the co-operating part 15 of the link along a chord transversely across the bore 17 thereof after the screw-threaded portion 16' of the shank 16 has been screwed into the said bore, the pin 19 thus serving to prevent separation of the parts 14 and 15 of the link 7.

To ensure that the outside faces of the parts 14 and 15 of the link 7 are retained in alignment with each other, and to prevent the accidental relative rotation of these parts, there may be further provided a leaf spring 39 mounted at one end by suitable means such as, for example, screws 39' as shown, on the inner surface of the part 14 of the link at or near the pivoted end thereof, the other end of the spring 39 being in pressing contact over substantially the whole width of the inner surface of the link part 15, the spring 39 thus serving to prevent accidental relative rotation of, and mis-alignment of, the outside faces of, the parts 14 and 15 of the link.

Alternatively, or in addition, the shank 16 may be provided with a longitudinal diametrical slot 20 (see Figure 6), through which is passed a split pin 21 fitted diametrically into the part 15, the pin 21 preventing relative rotation of the parts 14 and 15 and also serving to substantially retain alignment between the outside faces of the parts 14 and 15 of the link 7. The pin 21 is removable when it is desired to adjust the overall length of the link 7.

In a modification of the link, shown in Figure 7, the screw-threaded portion 16' of the shank 16 is provided with a longitudinal slot of keyway 16a extending from the upper end of the shank to about three quarters the way down the screw-threaded portion 16'. The co-operating part 15 of the link is provided in one of its sides with a screw threaded hole 19a whose axis is at right angles to the longitudinal axis of the screw-threaded shank portion 16', the hole 19a communicating with the axial bore 17 and being adapted to have screwed therein a grub screw 19' having a reduced inner end 19". The end 19" of this grub screw 19' engages within the slot or keyway 16a when the grub screw 19' is screwed so far into the hole 19a that the end thereof remote from the pointed end is flush with the side of the part 15 of the link, thus serving to prevent accidental relative rotation of, and mis-alignment of, the outside faces of the parts 14 and 15 of the link. The screw-threaded hole 19a is disposed in such a longitudinal position in the part 15 that the part 19" of the grub screw 19' abuts against the end of the slot or keyway 16a when the shank 16 is screwed so far into the axial bore 17 that the respective ends of the parts 14 and 13 of the link abut one another.

To the end of the link 7 remote from the end pivoted to the bracket 12, there is pivotally attached an actuating lever, generally indicated by the reference numeral 22, which is bifurcated or forked at the link end thereof so as to embrace the end portion of this link. A pivot pin 23 mounted near the end of the link 7 passes through the cheeks 25 of the forked end portion of the actuating lever 22 and is disposed so that its axis is parallel with the axis of the pivot pin 13. A small clearance is provided between the link 7 and the bifurcated end portion of the actuating lever 22 in order to provide for slight side-play between the primary and secondary parts of the fastener.

The actuating lever 22 is of double-ended form, having one arm 24 projecting away from the pivot pin 23 to form an operating or finger piece by which the lever may be manipulated, and also the arm formed by the cheeks 25 which project in parallelism in the opposite direction from the pivot pin 23 to the arm 24, these cheeks 25 having part-circular recesses 26 in the free ends thereof and thus being of hooked form for engagement with a pair of arcuate anchorage or fulcrum plates 27 rigidly carried in laterally spaced relationship on the side walls of, and within, the slotted end of the housing 2 forming the secondary part 1 of the fastener.

To close and lock the fastener, the link 7 is swung about the pivot pin 13 until the hooked ends of the cheeks 25 of the actuating lever 22 engage with the fulcrum plates 27 within the housing 2. The arm 24 of the actuating lever 22 is now moved arcuately about the pivot 23, the edges of the recesses 26 in the ends of the cheeks 25 bear on the curved surfaces of the arcuate fulcrum plates 27, and the lever 24 is finally brought into the locking position. The said pair of arcuate fulcrum plates 27 within the housing 2 are so disposed that, when the actuating lever 22 is in the locking position, the axis of the pivot pin 23 passes through and beyond the plane containing the centre of curvature 27' of the arcuate fulcrum plates 27 (see Figure 3) and the axis of the pivot pin 13. Thus the axis of the pivot pin 23 moves through a dead-centre position and beyond this position to an over-dead-centre position with respect to the axis of the pivot pin 13.

By the movement of the actuating lever towards and into the locking position, the primary part 5 and the secondary part 1 of the fastener, and the members 11 and 10 to which these parts are respectively attached, will have been drawn fully towards one another. Figure 3 illustrates the fastener in locked position and further illustrates the link and actuating lever in a released or unfastened position, the said parts being shown in the latter case in dot-and-dash lines.

The cheeks 25 of the actuating lever 22 carry a stop pin 28 transversely across the inner sides thereof, the stop pin 28 co-operating with a stop shoulder 29 provided on the outer end of the toggle link 7 to limit the pivoting movement of the actuating lever 22 relatively to the link 7 in the releasing direction.

When the fastener is locked, the actuating lever 22 lies wholly within the hollow housing 2 forming the secondary part 1 of the fastener with the outer surface of the lever preferably flush with the outer edge surfaces of the said housing. Moreover, the lever 22 substantially closes the outer side of the housing 2 except for a short portion thereof at the end of the housing remote from the fulcrum plates 27. The latter part of the housing 2 is closed by a closure plate formed by the tip portion 30 of a latch lever generally indicated by the reference numeral 31, this latch lever being pivoted at the end remote from the tip portion 30 upon a pivot pin 32 mounted in the side walls of the housing 2 and extending transversely across the latter.

The latch lever 31 is also provided at the pivoted end thereof with a hooked or latched nose 33 spaced forwardly of the said pivot pin 32 and adapted to engage, when the actuating lever 22 is in the locked position (shown in Figure 3), with a pin 34 carried by the cheeks 25 of the actuating lever and extending transversely thereacross, the pin 34 being disposed longitudinally further from the pivot pin 23 than the pin 28 previously described. The engagement of the hooked or latched nose 33 with the pin 34 retains and locks the actuating lever 22 against movement in the releasing direction, thus forming an auxiliary means for locking the fastener, and a further safeguard against its accidental release.

The latch lever 31 is urged to its locking position by means of a spring 35, one end of which is disposed in a recess 36 in the latch lever 31 and the other end of which abuts the bottom of the housing 2 and is accommodated therein within a shallow recess 37. A stop 38 is provided to limit the outward swinging movement of the latch lever 31 and the inward movement of actuating lever 22, the stop being mounted in the side walls of the housing 2 and extending transversely thereacross.

When the latch lever 31 is in its locking position, the tip portion 30 of the lever preferably lies flush with the outer edge surfaces of the side walls of the housing 2 and forms a push button by which the latch lever 31 may be operated to release the actuating lever 22 of the fastener when desired and to enable fingers to be engaged under lever 22. Figure 3 illustrates the latch lever 31 in its normal or locking position and further illustrates in dot-and-dash lines the position which the tip portion 30 of the latch lever 31 would occupy when fully pressed inwardly against the action of the spring 35 so as to unlock the actuating lever 22. The latch lever 31 also serves, when in its normal or locking position, to shield the free extremity of the arm 24 of the actuating lever 22 by making a flush butt-joint therewith, thus precluding access thereto until the latch lever has been pressed inwardly and guarding against accidental withdrawal of the actuating lever by catching of a garment or the like or by similar accidental means.

When the fastener is intended for use in fastening together two members of sheet-like form, for example as an aircraft cowling fastener, and it is desired to fasten the two members together in such a way that there is no pronounced interruption or break in the relative common level or curve of the two members, it is advantageous for the members to overlap when fastened together and for the edge portion of the lower of the two members to be bent transversely in L-shaped manner so that the edge portion of the upper of the members lies over the bent portion of the lower member without substantial interruption or break in the relative common level or curve of the two members. A slot is provided in the bent portion of the lower member to accommodate the secondary portion of the fastener. Figure 1 illustrates this preferred construction of the upper and lower members, but it must be realised that this is not essential and that the fastener may be applied in many other ways and for many different purposes.

Where the link is likely to be subjected to transverse shear forces, e. g. where the fastener is used to secure together two relatively movable members which may be subject to some force tending to move them laterally with respect to each other, the link and in particular the shank connecting the two parts of the link together, will be subjected to a certain amount of shearing force, and to increase the resistance of the fastener to these shear forces the parts of the link are reversed or one part is made longer than the other so as to bridge the gap between the primary and secondary parts of the fastener. These parts may be made of a metal suitably resistant to shear force, such as, for example, steel. Figure 8 illustrates a fastener in which the link part 14a, corresponding to the link part 14 as shown in Figures 1 to 6, and the link part 15a, corresponding to the link part 15 as shown in Figures 1 to 6, occupy respective positions such that a substantially greater thickness of material bridges the gap between the primary and secondary parts of the fastener, thus increasing the strength of the fastener when subjected to such a shear force. In this case, no clearance, is allowed between the link parts 14a and the bifurcated end portions of the actuating lever 22, and the link part 15a and the bifurcated end of the bracket 12 provided on the primary part of the fastener, so that the fastener is resistant to shear forces.

It will thus be seen that there is provided by this invention an improved toggle fastener having means whereby it can be adjusted to make it suitable for use in a variety of different circumstances, and means ensuring that the fastener will not accidentally be released.

Thus the toggle fastener may be adapted to be, in the locked position, flush with the two members with which it is associated, the fastener itself presenting a flush outside surface having substantially no projections or recesses, and thus presented as a whole an uninterrupted smooth contour highly desirable in cases when the fastener is applied to the outside surfaces of aircraft, having the additional advantage of greatly reducing the possibility of accidental release of the fastener.

As previously described, the invention provides auxiliary locking means for the fastener, thus increasing the reliability of the same. It is a further advantage of the invention in that a fastener is provided which may be closed and positively locked in one operation, the said one operation also causing the said auxiliary locking means to operate as well as the main locking means. Thus this double lock is simple and does not detract from the simplicity or speed of operation of the fastener.

A still further advantage of the invention lies in the fact that there is provided in the fastener adjustment means, readily operated without the need of tools, for accommodating different spacings between the primary and secondary parts of the fastener. Thus the fastener may be so adjusted whilst it is fulfilling a certain purpose or serving a certain use, or it may be adjusted to fulfill other purposes or serve other uses.

I claim:

1. A toggle fastener comprising a primary part and a secondary part adapted to be mounted respectively on each of two relatively separable members, said primary part comprising a bracket and said secondary part comprising a recessed housing; a two-part link pivoted at one end to said bracket, the parts of said link being axially adjustable to vary the length of the link; an actuating lever, pivoted between its ends to the free end of said link, and comprising a bifurcated end part embracing said free end of the link, and a finger piece at the end thereof remote from said bifurcated end part; an arcuate fulcrum member within and at each side of said housing adapted to be engaged by said bifurcated end part of the actuating lever for partial rotation of the actuating lever therearound to bring the latter into a locking position wherein its front surface lies flush with the front surface of said secondary part and closes part of the recess in said housing, and wherein the pivot of said link with the actuating lever is positioned to the rear of the plane containing the centres of curvature of the said fulcrum members and the pivot of the link with said bracket; a latch lever pivoted to said secondary part within the recess of said housing; a finger piece on said latch lever closing that part of the recess in said housing not closed by the said actuating lever in the said locking position thereof; locking means on said latch lever adapted to engage said actuating lever when in its said locking position; a spring positioned in said housing and cooperating with said latch lever to urge said locking means thereon into its actuating lever-engaging position, depression of the finger piece of said latch lever into the recess of said housing and against the influence of said spring serving to disengage said locking means from said actuating lever and to give digital access to the finger piece of the latter; and a stop member within said housing positioned to engage the rear surface of said actuating lever to prevent the latter being moved into said recess in the said housing beyond its said locking position, and to engage said latch lever and to prevent the latter moving under the influence of said spring beyond the position thereof in which said locking means engage said actuating lever.

2. A toggle fastener according to claim 1, including a pair of rearwardly extending cheeks carried by said actuating lever, and a transverse locking pin bridging said cheeks for engagement with said locking means on the latch lever when the actuating lever is in its said locking position.

3. A toggle fastener according to claim 2, in which said locking means comprise a hook on said latch lever positioned to engage said locking pin, said hook being disengageable from the locking pin by depression of the finger piece of said latch lever into said recess in the said housing.

4. A toggle fastener according to claim 3, in which said latch lever is pivoted near one of its ends within said recess in the said housing with the pivot axis of said latch lever parallel with the fulcrum axis of said fulcrum members, the free end of said latch lever forming the said finger piece thereof, and said hook being formed in the front surface of said latch lever, intermediate said pivot and said finger piece thereof, with the entrance of said hook facing said pivot of the latch lever.

5. A toggle fastener according to claim 4, in which said latch lever is furnished with a recess in its rear surface intermediate its pivot and its said finger piece and said housing is furnished with a recess in its rear wall opposite to the recess in said latch lever; and in which said spring comprises a helical compression spring having its ends positioned in, and located by, the said recesses.

6. A toggle fastener according to claim 5, in which cooperating stop means are carried respectively by said actuating lever and said link to limit pivotal movement of said actuating lever with respect to said link, in the unlocking direction.

7. A toggle fastener comprising a primary part and a secondary part adapted to be mounted respectively on each of two relatively separable members, said primary part comprising a bracket and said secondary part comprising a recessed housing; a two-part link pivoted at one end to said bracket and comprising a screw threaded male part and a screw threaded female part into which said male part screws, the length of said link being adjustable by relative rotation of said male and female parts thereof; means for preventing unintentional relative rotation of said male and female parts; an actuating lever, pivoted between its ends to the free end of said link, and comprising a bifurcated end part embracing said free end of the link, and a finger piece at the end thereof remote from said bifurcated end part; an arcuate fulcrum member within and at each side of said housing adapted to be engaged by said bifurcated end part of the actuating lever for partial rotation of the actuating lever therearound to bring the latter into a locking position wherein its front surface lies flush with the front surface of said secondary part and closes part of the recess in said housing, and wherein the pivot of said link with the actuating lever is positioned to the rear of the plane containing the centres of curvature of the said fulcrum members and the pivot of the link with said bracket; a latch lever pivoted to said secondary part within the recess of said housing; a finger piece on said latch lever closing that part of the recess in said housing not closed by the said actuating lever in the said locking position thereof; locking means on said latch lever adapted to engage said actuating lever when in its said locking position; a spring positioned in said housing and cooperating with said latch lever to urge said locking means thereon into its actuating lever-engaging position, depression of the finger piece of said latch lever into the recess of said housing and against the influence of said spring serving to disengage said locking means from said actuating lever and to give digital access to the finger piece of the latter; and a stop member within said housing positioned to engage the rear surface of said actuating lever to prevent the latter being moved into said recess in the said housing beyond its said locking position, and to engage said latch lever and to prevent the latter moving under the influence of said spring beyond the position thereof in which said locking means engage said actuating lever.

8. A toggle fastener according to claim 7, in which said means for preventing unintentional rotation of the said male and female parts of said link comprise a leaf spring carried by one of said parts and a flat on the other of said parts adapted to be engaged by the said leaf spring.

9. A toggle fastener according to claim 7, in which said means for preventing unintentional rotation of the said male and female parts of said link comprise a pin in said female part adapted to pass through a slot in said male part.

10. A toggle fastener according to claim 7, in which said means for preventing unintentional rotation of the said male and female parts of said link comprise a grub screw in said female part adapted to engage a groove in the thread of said male part.

THOMAS G. LLEWHELLIN.

REFERENCES CITED

The following references are of record in the file of this patent:

UNITED STATES PATENTS

| Number | Name | Date |
| --- | --- | --- |
| 366,143 | Andrews et al. | July 5, 1887 |
| 1,596,710 | Binks | Aug. 17, 1926 |
| 2,465,452 | Helling | Mar. 29, 1949 |
| 2,476,268 | Beck et al. | July 19, 1949 |

OTHER REFERENCES

"Quick Release Fasteners on German Aircraft" (Pamphlet) by D. B. Cobb, March 1943.